June 28, 1960 G. B. HERZOG ET AL 2,943,143

COLOR IMAGE REPRODUCTION APPARATUS

Filed Feb. 1, 1955 4 Sheets-Sheet 1

INVENTORS
LESLIE L. BURNS, JR.
& GERALD B. HERZOG

BY

ATTORNEY

INVENTORS
LESLIE L. BURNS, JR.
& GERALD B. HERZOG

BY

ATTORNEY

COLOR IMAGE REPRODUCTION APPARATUS

Filed Feb. 1, 1955 4 Sheets-Sheet 3

INVENTORS
LESLIE L. BURNS, JR.
& GERALD B. HERZOG

BY

ATTORNEY

COLOR IMAGE REPRODUCTION APPARATUS

Filed Feb. 1, 1955 4 Sheets-Sheet 4

INVENTORS
LESLIE L. BURNS, JR.
& GERALD B. HERZOG
BY
[signature]
ATTORNEY 2,943,143

COLOR IMAGE REPRODUCTION APPARATUS

Gerald B. Herzog and Leslie L. Burns, Jr., Princeton, N.J., assignors to Radio Corporation of America, a corporation of Delaware Filed Feb. 1, 1955, Ser. No. 485,445

9 Claims. (Cl. 178—5.4)

Figure 1:
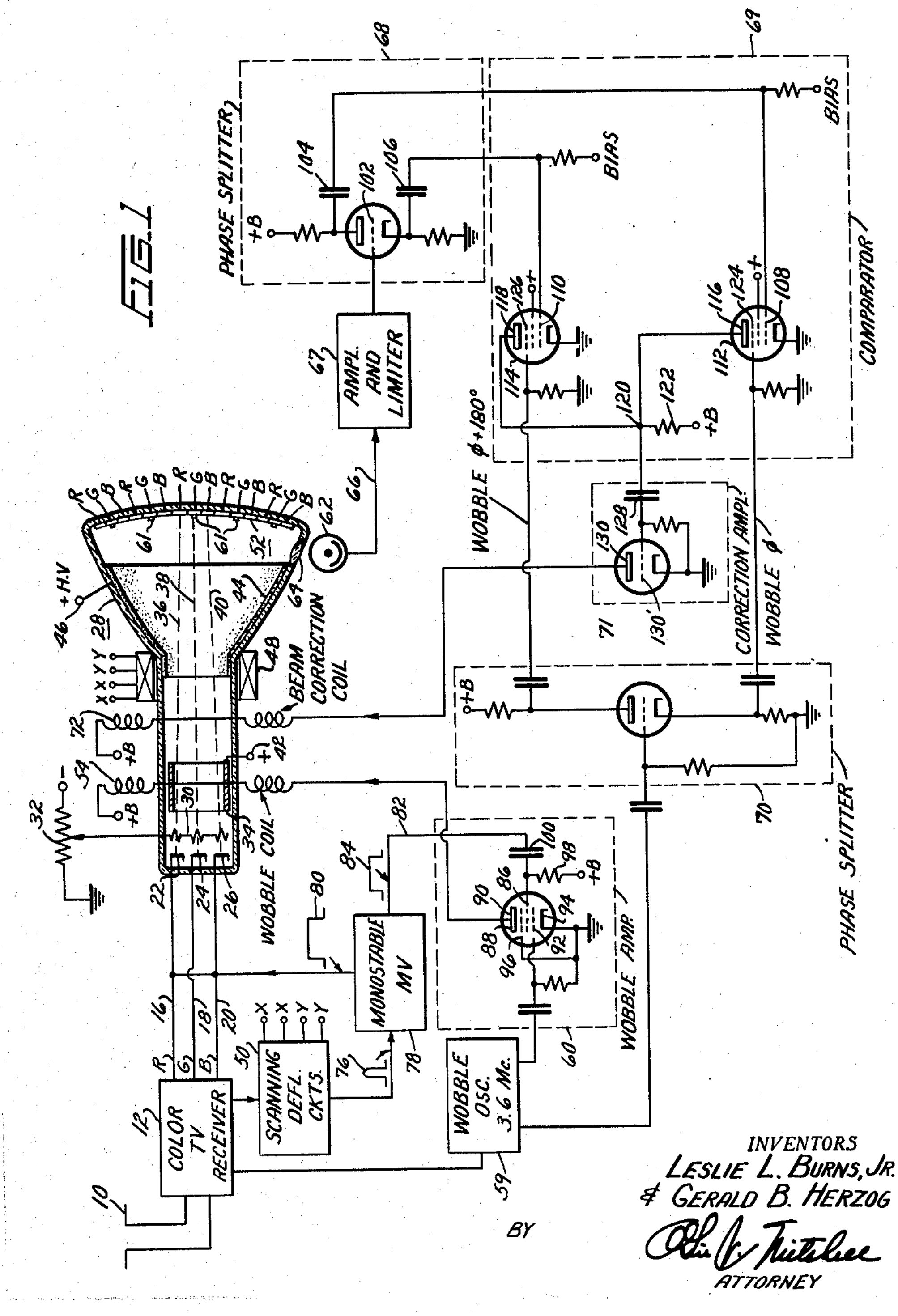

The present invention relates to new and improved television image reproduction apparatus and, particularly, to apparatus of the type employing a cathode ray tube of the so-called horizontal "line screen" variety.

Among the forms of color television image reproducing apparatus proposed thus far is one which includes a cathode ray kinescope having a target screen made up of a plurality of groups of strip-like elements adapted to emit light of respectively different colors in response to electron beam impingement. In the case of such a tube, means are provided for causing a plurality of electron beam components to scan a raster pattern on the screen, the raster comprising a plurality of horizontal line scans separated from each other vertically but being in the direction parallel to the groups of strip-like elements. Means are provided additionally, as a practical matter, to insure tracking of the groups of color elements by the electron beam components in an orderly sequence so that the video signals representative of the respectively different component colors of the image being televised are actually employed in controlling the intensity of the beam component intended to illuminate a given color-producing element. Such means, which may be considered as partaking of the nature of a servo mechanism, employ, for example, special elements (e.g., ultra-violet light-emitting material) associated with the target screen for sensing the vertical position of the beam components and for providing indications thereof and means responsive to such indications for correcting the vertical position of the beam components with respect to the screen.

Arrangements are known in which a single electron beam is caused to "wobble" or undulate vertically in its horizontal travel during a television line scan so that the beam successively impinges upon phosphor strips of different color characteristics and video signals respectively representative of such colors are applied successively to the beam intensity controlling electrode in the proper sequence. One proposal for insuring that the electron beam in such a tube tracks a given group of phosphor strips provides for a strip of material such as utltra-violet light-emitting phosphor which is disposed along each color phosphor of a given color, so that as the beam crosses the ultra-violet phosphor strip an indexing signal is produced which may be compared with a standard for the purpose of determining the propriety of the beam's position.

Where it is desired to employ a plurality of electron beams in a horizontal line screen color kinescope, the tracking problem is rendered more difficult.

It is a primary object of the present invention to provide novel means for causing a plurality of electron beams to track along predetermined horizontal paths in a horizontal line screen kinescope.

Another object of the invention is the provision of means for insuring, in a simple but effective manner, the tracking of predetermined paths in a horizontal line screen color kinescope by a plurality of electron beams, each of which is adapted to scan along a phosphor strip of a selected component color characteristic.

In general, the present invention provides novel color image reproducing apparatus which includes a cathode ray tube having a screen made up of a plurality of groups of horizontally oriented strip-like elements (e.g., phosphor strips) of respectively different light-emitting characteristics and means for causing a plurality of electron beams to scan across the screen, each beam being caused further to "wobble" in its travel. The target screen also includes index signal-producing elements (e.g., ultra-violet light-emitting phosphor) which, in response to electron impingement, generate signals indicative of beam position. In order to insure that the index signals thus generated are the result of the travel of a particular one of the beams (i.e., the "control" beam), means are additionally provided for blanking all but that electron beam during the first part of each line scansion. Thus, each line scan may be viewed as comprising a first, relatively short interval in which lock-in of the control beam is accomplished, followed by the useful portion of the scan during which none of the beams is blanked and in which image reproduction is effected by the several beams.

In accordance with a first illustrative embodiment of the invention, three such beams are provided and are caused to scan across a screen made up of a plurality of triads of respectively different, horizontally oriented color strip-like elements, one selected element of each triad being provided with a tracking index signal-producing element along its longitudinal center. Tracking circuit means are included for receiving index signals and for comparing such signals with a reference, whereby to produce a correction signal which may be employed in repositioning the electron beams in the vertical direction.

Another illustrative form of the invention employs, instead of a single index signal element per triad, a pair of vertically spaced index elements in conjunction with each triad, the index elements of a pair being symmetrically disposed with respect to one of the strip-like color elements of a triad, so that the electron beam which is intended to illuminate that color normally describes a sinusoidal wobble path whose "positive" and "negative" peaks are limited by the index elements of a pair. That is, the beam may be said to "ride" between the index elements of a pair. Tracking circuit means are provided for comparing the resultant index signals with the reference to produce a correction signal. During the first part of each line scan, however, (i.e., during the "lock-in" period), the amplitude of wobble imparted to the control beam is substantially enlarged, so that the positive and negative peaks of the sinusoidal path described by the control beam lie on opposite sides of the pair of index elements. To accommodate the different phasing of the index signals thus produced during the lock-in period, means are provided for shifting the reference wave which is applied to the tracking circuit means during that interval.

A further illustrative form of the invention is generally applicable to both of the above-described forms in that in accordance therewith, means are provided for defining the period in which all of the beams except the "guiding" beam are blanked as the period beginning at the commencement of a line scanning interval and ending when that beam is properly "locked in," as determined by the tracking control apparatus.

As will be appreciated, the present invention affords the advantages of increased light output over that normally available with single beam kinescopes of the line screen variety and a simplification of the apparatus required for applying the color representative video signals to the kinescope.

Figure 2A:
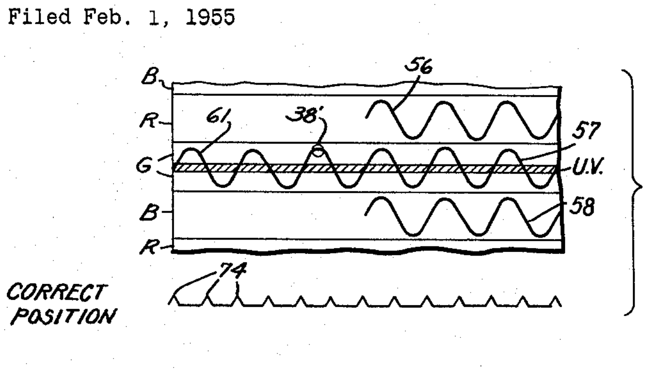
Figure 2B:
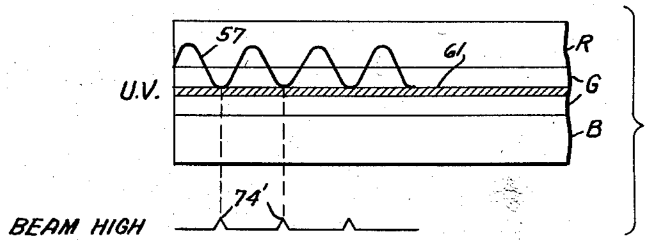
Figure 2C:
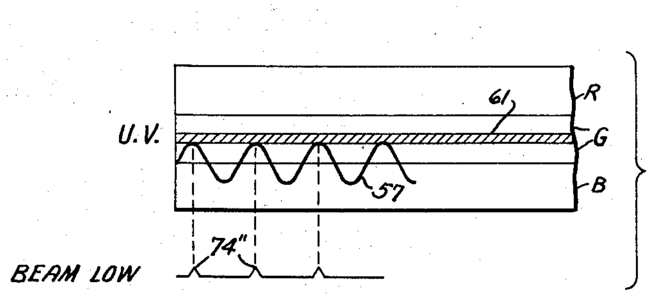
Figure 3:
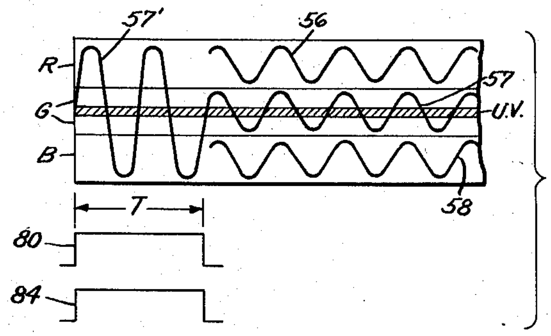
Figure 4A:
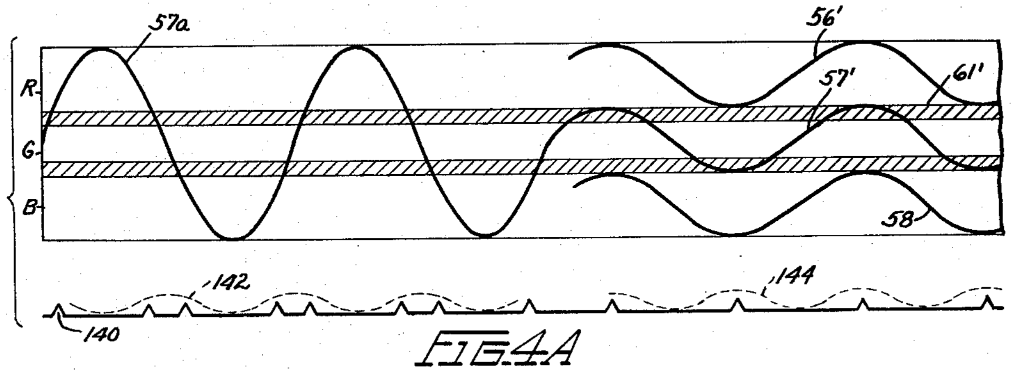
Figure 4B:
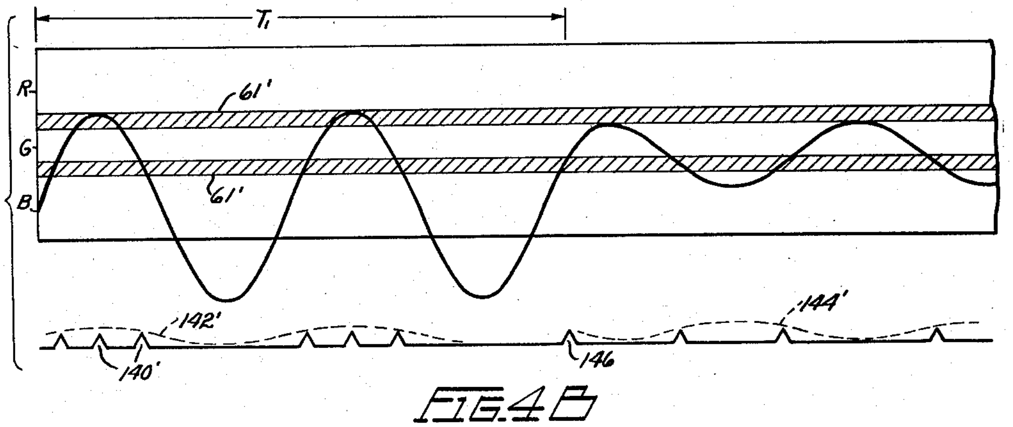
Figure 4C:
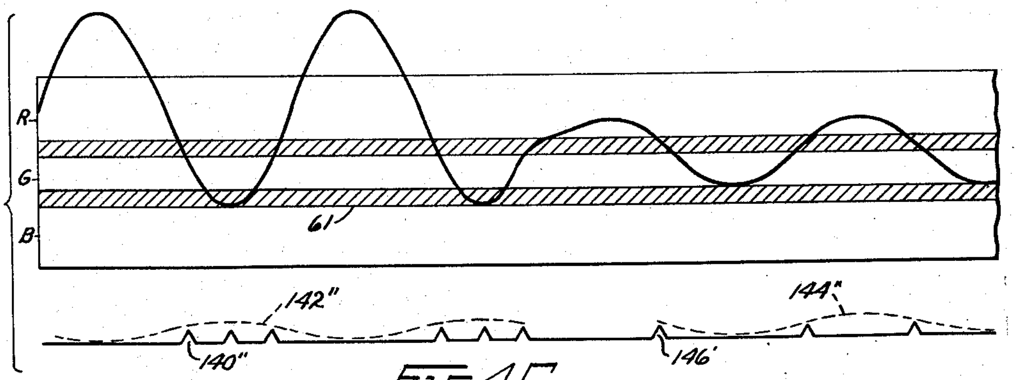
Figures 5, 6:
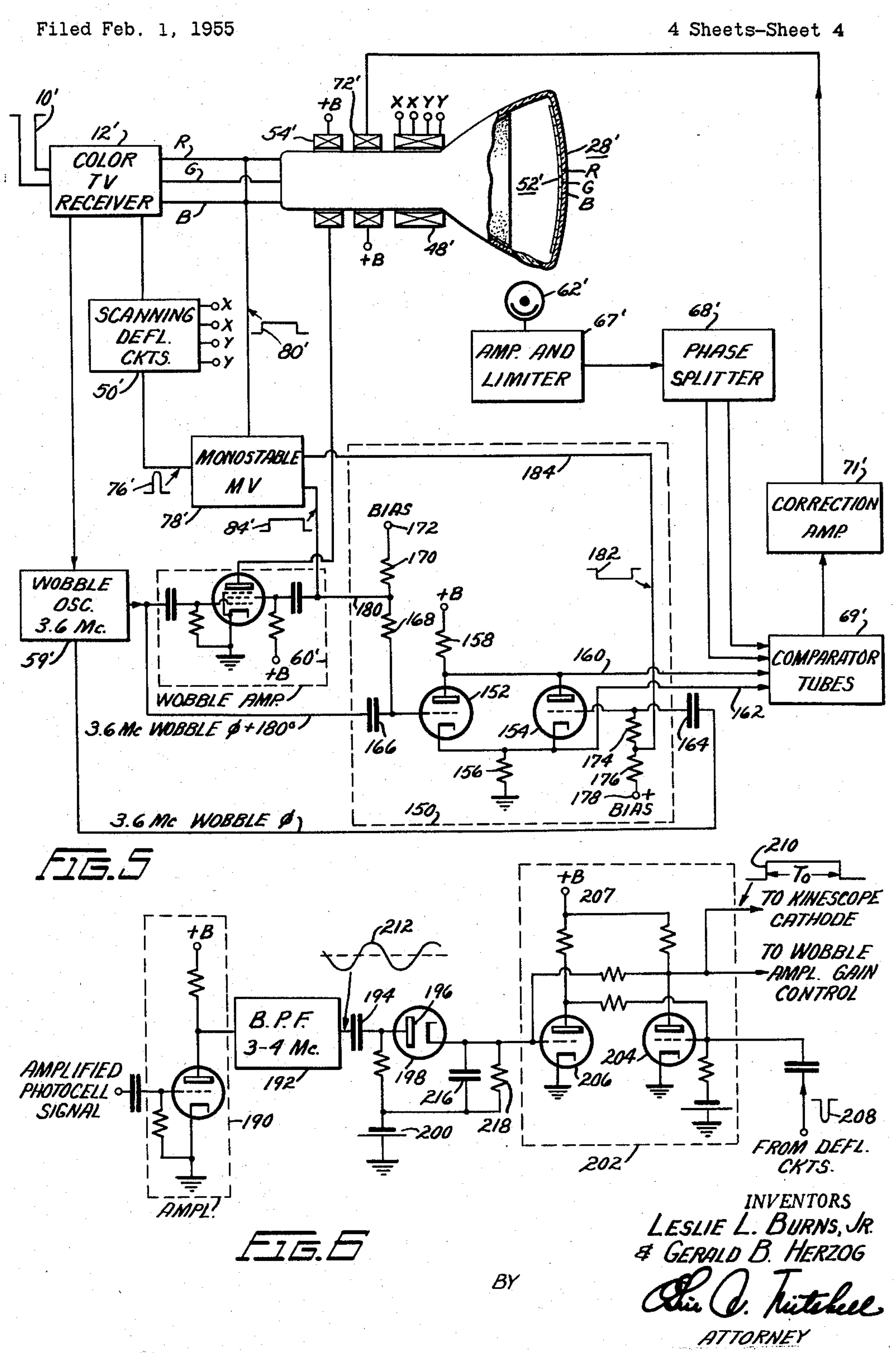

Additional objects and advantages of the present invention will become apparent to those skilled in the art from a study of the following detailed description of the following accompanying drawing in which:

Fig. 1 illustrates, by way of a block and schematic circuit diagram, a color television receiver in accordance with one form of the invention;

Figs. 2(*a*), 2(*b*) and 2(*c*) indicate illustrative index signals generated by the apparatus of Fig. 1 for different conditions of beam tracking;

Fig. 3 illustrates an additional aspect of the operation of the apparatus of Fig. 1;

Figs. 4(*a*)–4(*c*) are views similar to those of Figs. 2(*a*)–2(*c*) and illustrative of the operation of another form of the invention;

Fig. 5 is a block and schematic circuit diagram of apparatus whose operation is illustrated by Fig. 4(*a*); and Fig. 6 illustrates another form of the invention.

Referring to the drawing and, particularly, to Fig. 1 thereof, there is shown an illustrative color television receiver which may be of any suitable type. An antenna 10 intercepts broadcast signals which may, for example, be of the presently standardized color television variety and which may be viewed as comprising a first carrier wave which is amplitude modulated by black and white image information, and a sub-carrier wave which is phase- and amplitude-modulated by information regarding the hue and saturation of the television subject. Such signals are applied by the antenna to the receiver section 12 which is represented diagrammatically and which may be understood as containing the usual RF amplifier, converter, IF amplifier and second detector stages. The receiver section 12 further includes suitable color translator circuits which provide simultaneous red, green and blue color representative video signals at the output leads 16, 18 and 20.

Circuitry suitable for deriving simultaneous red, green and blue signals from signals standardized by the Federal Communications Commission on December 19, 1953, may be found, for example, in the book entitled "Practical Color Television for the Service Industry," revised edition, April 1954 (second edition, first printing) published by the RCA Service Company, Inc. The red, green and blue signals are applied, respectively, via the leads 16, 18 and 20 to the cathodes 22, 24 and 26 of a color image-reproducing kinescope 28 whose control electrode 30 is illustrated as connected to a suitable background potential source 32. An electrostatic focusing electrode 34 for focusing the electron beams 36, 38 and 40 produced by the cathodes is connected to a suitable positive potential terminal 42. A final anode 44, which may be in the form of a conductive coating on the interior of the kinescope cone portion is also provided with a high positive operating potential from the terminal 46. A conventional electromagnetic deflection yoke 48 comprising horizontal and vertical deflection windings is energized with deflection sawtooth currents of television line and field frequencies from scanning circuits 50 which receive synchronizing pulses derived from the received signals in the section 12.

The color image-reproducing kinescope 28 also includes a target screen 52 which is, by way of illustration, of the horizontal line phosphor strip variety shown more clearly in the enlarged fragmentary views of Fig. 2(*a*)–Fig. 2(*c*). That is, the target screen 52 is made up of a plurality of triads of phosphor strips, horizontally disposed with the strips arranged in the sequence R, G, B, R, G, B. The kinescope is additionally provided with an auxiliary deflection coil 54 for producing a high frequency "wobbling" of the electron beams, so that the beams are caused to trace a pattern (e.g., sinusoidal) with respect to the phosphor strips of a triad such as those indicated in Fig. 2(*a*), for example, by the lines 56, 57 and 58. Stated otherwise, the beam 36 produced by the cathode 22 is caused to wobble along the path 56 within the red phosphor strip R, while the beams 38 and 40 wobble along the paths 57 and 58, respectively, within the green and blue phosphor strips G and B. The reason for the wobbling of the beams will become apparent hereinafter. At this point, however, it may be noted, by way of example, that the coil 54 is energized from a wobble oscillator 59 which provides a color sub-carrier frequency wave (e.g., 3.6 megacycles) through a wobble wave amplifier 60. The oscillator 59 may be synchronized with the color sub-carrier wave by means of the color synchronizing "bursts" which occur during the horizontal blanking intervals of the television signal immediately following the horizontal scanning synchronizing pulses. Reference may be made to an article entitled "The NTSC Color-TV Synchronizing Signal" which appeared in the February 1952 issue of Electronics (McGraw-Hill Publishing Company, Inc.) for a detailed description of color synchronizing bursts. While it does not constitute a part of the present invention, it may be noted briefly that, since the color information in accordance with present standards is transmitted as phase- and amplitude-modulation of a sub-carrier wave, it is necessary to provide some means for synchronizing the receiver color decoding or translating circuits with the encoding apparatus of the transmitter so that selection of the several color signals may be made. The bursts therefore comprise several cycles of sub-carrier wave frequency of fixed phase, whereby to provide a reference phase for the color translating sections of the receiver.

As thus far described, therefore, it will be understood that, in the apparatus of Fig. 1, video signals respectively representative of the red, green and blue content of a television subject are employed in modulating the intensity of the electron beams 36, 38 and 40 which are adapted to scan along the red, green, and blue light-emitting phosphor strips R, G and B. As has been stated, color image reproducing arrangements of the horizontal line screen variety normally require means for insuring that electron beams within the kinescope properly "track" the correct phosphor strips. In accordance with one form of tracking arrangement as illustrated in Fig. 1, each of the green phosphor strips G is provided with a backing layer 61 of a material capable of emitting ultra-violet light in response to electron impingement. By virtue of the sinusoidal path 57 followed by the electron beam 38 as it scans along the green phosphor strip G, a pulse of ultra-violet light energy will be produced each time the beam 38 crosses the ultra-violet light strip 61. A photocell 62 receives the ultra-violet light through a window 64 and provides a current in the lead 66 indicative of the traversal of the ultra-violet light strip 61 by the electron beam 38. This current is applied via amplifier and limiter circuits 67 and a phase splitter 68 to comparator circuits shown within the dotted line rectangle 69 which also receive via a phase splitter circuit 70, reference waves bearing a predetermined relation to the wobble energy provided by the oscillator 59. The output of the comparator circuits of the described tracking control arrangement comprises a signal in the nature of a correction voltage which, after amplification by a stage 71, is applied to a correction coil 72 for causing the electron beams to be repositioned vertically to track the color phosphor strips in the desired manner. The correction coil 72 may be a winding of any suitable type capable of producing vertical shifting of the positions of the electron beams 36, 38 and 40.

The general operation of the arrangement outlined thus far in connection with Figure 1 will be described briefly. As will be seen from Figure 2(*a*) the electron beam spot 38' travels along the sinusoidal path 57 and, when properly tracking, crosses the ultra-violet index strip 61 of a given triad twice during each wobble cycle. The output signal of the phototube 62, therefore, will comprise, during proper tracking, a series of pulses 74 which are equally spaced in time and which occur at twice the wobble frequency, or at the rate of 7.2 megacycles per second. When the electron beam 38 is erroneously shifted upwardly to an extreme position so that the "negative" peaks of the sine wave 57 fall on the ultra-violet strip 61 (as shown in Figure 2(*b*)) the tracking index signals will occur at the rate of 3.6 megacycles per second and phased as shown by the pulses 74'. The tracking control circuits, including the comparators 69, derive a correction signal by comparing the phase of the 3.6 mc. component of the received pulses with a reference wave from the oscillator 59 and apply a correction voltage to the winding 72 for moving the beam downwardly to its proper position. As a result, the beams 36 and 40 are also moved downwardly to their proper positions.

Conversely, if the electron beams are erroneously shifted downwardly so that only the "positive" peaks of the sine wave 57 strike the ultra-violet light-emitting index strip 61 (as in Figure 2(*c*)) the pulses from the phototube 62 will be as indicated by the pulses 74''. The pulses 74'' occur at the rate of 3.6 megacycles per second and are phased differently (i.e., displaced 180°) from the pulses 74' which are produced when the beam 38 is in its uppermost position. In response to the pulses 74'', the tracking control circuits produce a correction voltage which, when applied to the coil 72, results in upward repositioning of the electron beams.

From the foregoing, it will be appreciated that, in accordance with the present invention, the electron beam 38 serves as the "control" or "guiding" beam, insofar as the tracking function is concerned, and that the other electron beams, by virtue of their being subjected to the same position-correcting action (i.e., as produced by the correction winding 72), follow the guiding beam. In order to insure, in operation, that the tracking index signals produced by the ultra-violet strips 61 are actually the result of impingement by the guiding beam 38, and not by one of the other beams 36 and 40, means are provided, as has been stated, for blanking the beams other than the guiding beam 38 during the first portion of each line scanning interval. As is understood by those skilled in the art, broadcast television signals are a composite of image information and scanning synchronization information, signals representative of the latter being transmitted as pulses of the requisite repetition rate superimposed upon beam-blanking pulses of specified duration. That is, the signal received and processed by the receiver section 12 in Figure 1 will include horizontal and vertical blanking pulses of sufficient duration to blank the electron beams 36, 38 and 40 during the periods of horizontal (line) "retrace" or "flyback," so that all three of the beams are extinguished during the same period between line scansions. In order to carry out the additional blanking of the beams 36 and 40 during the preliminary or lock-in period of each line scanning interval, the following apparatus is provided:

Pulses 76 corresponding to the horizontal flyback pulses normally produced in the deflection circuits 50 are derived from those circuits and applied to a multivibrator 78 which may be of any suitable variety capable of providing output pulses 80 occurring at television line scanning rate and of a duration sufficient to encompass a selected portion of a scanning line interval. The multivibrator 78 will be understood, therefore, as being, for example, a monostable type operative in synchronism with the input pulses 76 and may be of the variety shown and described in "Waveforms," volume 19 of the MIT publication series chapter 5, page 166. Positive output pulses 80 from the multivibrator are applied to the cathodes 22 and 26 of the kinescope 28 to blank the beams 36 and 40 for a predetermined period following the commencement of each line scanning interval. Thus, during that interval, only the green electron beam 38 (the guiding beam) will be "on," so that the ultra-violet light index pulses produced in the photocell 62 and tracking circuits will necessarily be the result of impingement of the index element by that beam as it wobbles sinusoidally along the path 57.

In order to render the action of the tracking control circuits even more positive during the preliminary or lock-in period of each line scanning interval, means are additionally provided in accordance with the invention for increasing the amplitude of the wobble path traversed by the guiding beam. Such means are indicated in Figure 1 as including a connection 82 for applying positive-going pulses 84 (corresponding in time and duration to the blanking pulses 80) to the screen grid 86 of the wobble amplifier tube 88. The amplifier 88 is of generally conventional construction, having an anode 90 connected to one end of the wobble coil 54, the other end of which is connected to a source of +B potential, a control grid 92 to which the 3.6 megacycle wobble wave is applied from the oscillator 59, a cathode 94 connected to ground as shown, a grounded suppressor grid 96 and the screen grid 86. The last-mentioned electrode is supplied with a suitable operating potential via a dropping resistor 98 connnected to a source of +B potential, the exact potential applied to the screen grid being selected to afford a nominal degree of gain. The amplitude of the pulses 84 which are applied to the screen grid 86 via a capacitor 100 is selected to increase the gain of the tube 88 by a predetermined amount sufficient to render the amplitude of the wobble path of such size as to traverse substantially the entire triad of the phosphor strips, as shown in Figure 3. In Figure 3, therefore, it will be seen that during the period "T" which includes the first portion of a line scanning interval, the electron beams 36 and 40 are extinguished, as described above, by the pulses 80 and that the wobble path 101 described by the beam 38 is of substantially greater amplitude in the vertical direction than that of the path 57 described during the active scanning portion of the line interval. The pulse 84 employed in increasing the amplitude of wobble is shown in Figure 3 as having the same time duration "T" as the pulse 80. The exact duration of the lock-in period (i.e., the duration "T") may be selected to be any relatively short period compared with the line scanning period, such, for example, as 5 percent thereof. The primary consideration in determining the factor "T" is that of providing sufficient time for the tracking control circuits to sense the actual position of the electron beam 38 and to correct its position before the other two electron beams are rendered active at the termination of the blanking pulse 80.

While the operation of the apparatus of Figure 1 has been described in general terms, a specific, illustrative tracking control arrangement, as shown in the drawing, will now be explained in greater detail. During the lock-in period "T," the electron beams 36 and 40 are extinguished by the blanking pulse 80, and current pulses from the phototube 62, such as those shown in Figures 2(*a*), 2(*b*) and 2(*c*) and resulting from the traversal of the ultra-violet light-emitting strip 61 by the beam 38, are applied via the amplifier and limiter circuits 67 to the control grid 102 of the phase splitter 68. Opposite phases of the pulses produced by the phototube are thus applied via the capacitors 104 and 106 to the control grids 108 and 110, respectively, of comparator tubes 112 and 114 whose cathodes may, as shown, be connected to ground potential and whose anodes 116 and 118, respectively, are connected together at a common load terminal 120 at the upper end of a load resistor 122. The suppressor grid 124 of the comparator 112 receives a wave of the same phase and frequency as that of the wobble wave applied to the coil 54, while the suppressor grid 126 is supplied with a wave of the opposite polarity therefrom (i.e., wobble phase plus 180°). These reference waves are applied to the comparator tubes via the phase splitter 70 which receives a version of the wobble frequency wave from the oscillator 59. The control grids 108 and 110 of the comparator tubes are connected to suitable bias potential terminals through grid-leak resistors and the common load terminal 120 of the comparators is connected via a coupling capacitor 128 to the control electrode of the output amplifier 71 which is of conventional form and which includes the beam position correction winding 72 in the load circuit of its anode 130.

Assuming that the winding 72 is so oriented with respect to the kinescope 28 that increased current through the winding moves the electron beams upwardly while decreased current moves the beams downwardly, the operation of the circuit of Figure 3 will be as follows:

The amplifier 67 may include an even number of stages, so that the polarity reversal of an amplifier may be disregarded. Its output signal will, therefore, be understood as being a signal of the same phase as the current produced by the photocell 62 which, as pointed out supra, is illustrated by the wave forms in Figures 2(*a*), (*b*) and (*c*). The amplified and limited photocell signal is applied to the comparator 114 and the opposite phase is applied to the comparator 112, the phase reversal being accomplished in the phase splitter 68. Assuming that the beam 38 is erroneously high (as shown in Figure 2(*b*) so that "negative peaks" of the wobble wave occur at the ultra-violet index strip 61, the output current pulses of the photocell will comprise the pulses 74' which are of the opposite phase from the wobble wave described by the beam. The comparator tubes 112 and 114 are so biased that, normally, the current through the winding 72 is sufficient to maintain the beam 38 (and the beams 36 and 40) in what may be termed a centered position. When the input signal to the control grid of the comparator 114 is in phase with the wave applied to the suppressor grid 126, however, that tube will conduct more heavily. Similarly, the tube 112 will conduct more heavily, causing the voltage at the terminal 120 to decrease, thereby lowering the potential of the control grid 130' of the output amplifier 71, with the result that current through the winding 72 is decreased in an amount sufficient to move the beam 42 downwardly to its correct position.

Conversely, if the beam erroneously moves downwardly in the scanning process, the photocell 62 will produce current pulses 74'' (Figure 2(*c*)) with the result that the pulses applied to the control grids 108 and 110 of the comparator tubes will be substantially of the opposite polarity from the 3.6 megacycle waves applied to their suppressor grids. Conduction of both of the comparator tubes will, therefore, decrease, causing the potential of the terminal 120 to increase, thereby applying a more positive potential to the control electrode 130' of the output amplifier. The current conduction of the amplifier 71 will thus increase to move the beam 38 upwardly to its proper position.

When the electron beam 38 is properly centered with respect to the ultra-violet light-emitting index strip 61, the index pulses 74 (Figure 2(*a*)) occur at a 7.2 megacycle rate, and with no 3.6 megacycle component, so that the comparator tubes produce no change in the conduction of the correction amplifier 71.

At the end of the lock-in period "T," the electron beams 36 and 40 commence their active scanning together with the electron beam 38. Moreover, the amplitude of the wobble path described by the beam 38 is reduced to its normal value and, as shown in Figure 3, the three beams scan simultaneously along the sinusoidal paths 56, 57 and 58, control of the vertical positioning of the beams being maintained by the tracking circuits in response to the repeated crossing of the ultra-violet strip 61 by the guiding electron beam 38.

Figures 4(*a*), 4(*b*) and 4(*c*) illustrate the operation of another form of the invention, circuitry for which is shown by the schematic diagram of Figure 5. In accordance with this form of the invention and as is shown in Figure 4(*a*), the three electron beams are caused to scan in the wobbling or undulatory fashion described in connection with the first embodiment, respectively, along the paths 56', 57' and 58' within the phosphor strips R, G and B. As opposed in the screen arrangement of Figure 2(*a*), however, the screen of Figure 4(*a*) includes a pair of index signal-producing elements 61' per triad, which elements are disposed, as shown, one above and one below the green phosphor strip G. Normally, therefore, and when the beams are properly tracking, the limits of vertical movement of the green designated electron beam are fixed by the strips 61' and the red- and blue-designated beams follow their paths, as indicated. Again, as in the case of the apparatus of Figures 1 through 3, each television line scansion interval is effectively divided into a brief "lock-in" period which is followed by the active scanning period. Also, the red- and blue-designated electron beams are blanked during the lock-in period, the amplitude of the wobble path of the green beam being enlarged as shown by the path 101'. By virtue of the arrangement of the ultra-violet strips in the screen of Figure 4(*a*) as distinguished from the disposition of the corresponding strip in the screen of Figure 2(*a*), however, a different arrangement for the tracking control circuit means is afforded in connection with the screen of Figure 4(*a*) so that the proper type of response may be had during both the locked-in period and the active scanning period of a line. This aspect of the invention will be more fully understood from the following description of the apparatus of Figure 5 in which those elements which may be identical to corresponding elements of Figure 1 are represented by blocks bearing the same reference numerals with the prime (') notation.

In Figure 5, color television signals are intercepted by an antenna 10' and applied to a receiver section 12' which provides, at its output leads, simultaneous red, green and blue video signals, which signals are applied to the beam intensity controlling electrodes (e.g., cathodes) of a color image reproducing kinescope 28' whose screen is of the type shown in Figure 4(*a*). It will be understood, however, that, aside from the screen, the kinescope 28' may be substantially identical to the kinescope 28 of Figure 1. A deflection yoke 48' associated with the kinescope and supplied with suitable deflection currents from the circuits 50' causes the beams within the kinescope to scan a raster on its screen 52'. A wobble coil 54' is supplied with alternating current energy of 3.6 megacycles from a wobble oscillator 59' via a wobble amplifier 60', so that the electron beams within the tube are caused to travel along the sinusoidal paths shown in Figure 4(*a*). Ultra-violet light index signal pulses produced by the ultra-violet strips 61' in response to electron impingement are received by a photocell 62' and are applied, after amplification and limiting in circuits 67', to a phase splitter 68'. Opposite phases of the index signal are thus provided by the phase splitter 68' to the comparator tubes indicated by the block 69'. The comparator tubes are adapted, as in the case of the apparatus of Figure 1, to provide a correction signal to a correction amplifier 71' which, in turn, furnishes a current through the correction coil 72' for repositioning of the electron beams when necessary.

In order to increase the amplitude of wobble of the guiding beam within the kinescope (i.e., the beam adapted to scan along the green phosphor strips G), pulses 84' of suitable duration equal to the length of the lock-in interval are applied by a multivibrator 78' to the screen grid of the wobble amplifier 60', just as in the case of the apparatus of Figure 1. The multivibrator 78' is synchronized by pulses 76' from the scanning deflection circuits 50' and corresponding to the flyback pulses in the latter circuits. Positive blanking pulses 80' are also provided by the multivibrator 78' and are applied to the cathodes of the kinescope 28'.

As has been stated, the configuration of the screen of Figure 4(*a*) requires a shift in the operation of the tracking control circuits between the lock-in period and the remainder of each line scanning interval. The reason for such shift will be apparent from a consideration of Figures 4(*a*), 4(*b*) and 4(*c*). The wave form illustrated below the screen section shown in Figure 4(*a*) indicates the fact that an ultra-violet light index signal pulse 140 is produced each time the electron beam traverses one of the ultra-violet light-emitting strips 61′. During the lock-in period, that is, during the interval $T_1$, the pulses 140 occur at the rate of 14.4 megacycles per second. By virtue of the unequal spacing of the pulses, however, there is present a comparatively large component of 7.2 megacycle energy as shown by the dotted line curve 142. The corresponding 7.2 megacycle component which is present after the lock-in period has ended, that is, during the active scanning interval, and as shown by the dotted line curve 144, is shifted in phase from that of the component 142. This shift in phase results from the fact that, during the lock-in period, the sinusoidal path traverses the ultra-violet light strips between the "peaks" of the sine wave, while, during the remainder of the line interval, the ultra-violet light signal pulses are produced by the "peaks" of the sine wave. It will thus be apparent that a shift in the operation of the phase comparator circuits of the tracking control arrangement is necessitated. The actual shift required will be better understood from the showings of Figures 4(*b*) and 4(*c*) which are illustrative of the conditions existing when the beams are erroneously positioned below and above, respectively, their proper positions.

In the extreme condition of Figure 4(*b*) in which the "positive" peaks of the sinusoidal path strike the upper one of the index strips 61′, the resultant index signal pulses will be as shown by the pulses 140′. By reason of the unequal spacing in time of these pulses, there is present a 3.6 megacycle component shown by the dotted line curve 142′. This curve is, as may be seen, "in phase" with the wobble path described by the guiding electron beam. If the guiding beam remains in an erroneously low position after the lock-in period has terminated and after the amplitude of wobble has been decreased to its normal size, the resultant index signal pulses will occur in time as shown by the pulses 146. These pulses are unequally spaced in time so that there is present a 3.6 megacycle component shown by the dotted line curve 144′, the phase of which is 180° displaced from the phase of the wobble path described by the beam. It will thus be understood that, while the error is in the same direction in both parts of the showing of Figure 4(*b*) namely, downward, the phase of the error signal produced in the photocell circuit is reversed.

A corresponding phase reversal occurs in the error signal for the condition in which the beams are erroneously located above their proper position, as shown in Figure 4(*c*). The guiding beam is sufficiently displaced upwardly from its normal position so that the "negative" peaks of the wobble path strike the lower index-signal producing element 61′ of the pair, the resultant index-signal pulses are as shown at 140″. The 3.6 megacycle component present in this signal is as shown by the dotted line curve 142″, which curve is 180° displaced in phase from that of the wobble path. When, during the active scanning interval after the termination of the lock-in period, the electron beam performing the guiding function is erroneously above its normal position, the index signal pulses 146′ have a 3.6 megacycle component 144″ which is in phase with the wobble path.

By reason of the foregoing, means are provided in the apparatus of Figure 5 for reversing the sense of operation of the tracking control circuit between the two conditions of operation (i.e., the lock-in operation and the active scanning operation). This apparatus is indicated schematically within the dotted line rectangle 150 which will be understood as comprising a switching arrangement operative to apply different phases of the reference wave from the oscillator 59′ to the comparator tube circuitry 69′. The switching arrangement 150 comprises, by way of example, a pair of tubes 152 and 154, each having a cathode, a control grid and an anode. The cathodes of the tubes 152 and 154 are connected to a suitable reference potential (e.g., ground) through a common resistor 156, while the anodes of the tubes are connected to a source of +B operating potential through a single resistor 158. A signal lead 160 connects the anodes of the switching tubes to the suppressor grid of one of the comparator tubes in the box 69′, while a signal lead 162 connects the cathodes of the switching tubes to the suppressor grid of the other comparator tube. A wave of 3.6 megacycle energy of wobble phase is applied from the oscillator 59′ via a capacitor 164 to the control grid of the switching tube 154 and a 3.6 megacycle wave of the opposite phase (i.e., wobble phase plus 180°) is applied to the control grid of the tube 152 via a capacitor 166. The control grid of the tube 152 is connected, (through resistors 168 and 170) to a bias terminal 172, the potential of which is sufficient to maintain the tube 152 normally in a nonconductive state. Similarly, the control grid of the tube 154 is connected through resistors 174 and 176 to a bias terminal 178, the potential of which is sufficient to maintain the tube 154 normally conductive. A connection 180 between the multivibrator 78′ and the junction of the resistors 168 and 170 supplies positive-going pulses 84′ to the control grid of the tube 152 for rendering that tube conductive during the duration of the pulse. These pulses, as explained supra, begin in synchronism with the horizontal fly-back pulses 76′ and have a duration $T_1$ equal to the duration of the lock-in interval. Corresponding pulses, but of negative polarity, as shown at 182, are applied via a lead 184 from the multivibrator 78′ to the junction of the resistors 174 and 176 for application to the control grid of the switching tube 154. For the duration of the pulse 182, the tube 154 is rendered non-conductive.

The operation of the switching arrangement 150 is as follows:

During the lock-in period ($T_1$ in Figure 4) the pulses 84′ and 182 render the switching tubes 152 and 154, respectively, conductive and non-conductive. The tube 152 acts, therefore, as a conventional phase splitter device and, by virtue of the fact that the signal applied to its control grid is a 3.6 megacycle wave of wobble phase plus 180°, the signals applied to the comparator tubes via the leads 160 and 162 will be 3.6 megacycle waves of wobble phase and wobble phase plus 180°, respectively. These reference signal phases may be assumed, for purposes of this explanation, as being the proper phases required for operation of the comparator tubes of the circuitry 69′, that is, for comparison with the phase of the index signal waves derived by the photocell 62′. At the end of the lock-in period $T_1$, the pulses 80′ and 182 are terminated, so that the tubes 152 and 154 revert to their normal states, namely, those in which the tube 152 is non-conductive and the tube 154 is conductive. Since the signal applied to the control grid of the tube 154 is a wave of wobble phase, the signals which are applied to the comparator tubes via the leads 160 and 162 will be waves of the same frequency but, respectively, of wobble phase plus 180° and wobble phase. Thus, it will be understood that the phases of the reference waves applied to the comparator tubes are the reverse of those employed during the lock-in period, whereby the stated requirement is met. Aside from the phase reversal of the reference waves applied to the comparator tubes of the tracking control arrangement, the overal operation of the apparatus of Figure 5 is identical to that described in connection with the apparatus of Figure 1.

From the foregoing, it will be appreciated that the present invention, as described thus far, provides novel image-reproducing apparatus employing a kinescope of the horizontal line screen variety and means for causing a plurality of electron beams to scan along the screens parallel to the lines thereof but in wobbling fashion. Tracking control means responsive to index signals produced by the traversal of index elements by one of the electron beams provide continuous control over the vertical positioning of the beams.

In the apparatus of Figure 5, as in the case of Figure 1, the duration of the scanning lock-in period is determined or fixed by the time duration of pulses applied to the kinescope cathodes which produce the red and blue electron beams (for blanking purposes) and by corresponding pulses applied to a gain controlling electrode (e.g., the screen grid) of the wobble amplifier for increasing the amplitude of the wobble. In other words, the duration of the lock-in period is established according to those forms of the invention by the setting of the multivibrator device which furnishes the described pulses. According to another form of the invention which is illustrated in Figure 6, means are provided for rendering the duration of the lock-in period flexible, that the lock-in period may continue until the guiding beam is actually locked in with its index signal-producing element or elements. That is to say, the circuitry of Figure 6 may be substituted, if desired, for the monostable multivibrator of Figures 1 and 5.

In the arrangement of Figure 6, means are provided for producing a pulse whose leading edge is substantially coincident with the horizontal or line flyback pulse and which continues in time until the amplitude of error signal derived from the photocell circuit falls below a preselected threshold value, at which time the pulse terminates. This pulse, when applied with suitable polarity to the cathodes of the kinescope which produce the red- and blue-designated electron beams and to the gain-controlling electrode of the wobble amplifier, maintains the red and blue beams blanked and increases the amplitude of the wobble path described by the guiding beam. Amplified index signal pulses produced in the photocell of the tracking control arrangement in response to electron impingement upon the index-producing element or elements are applied, after amplification and limiting, to the control grid of an amplifier 190 which, in turn, applies the amplified pulses to the input of a bandpass filter 192 having a passband of 3 to 4 megacycles. The 3.6 megacycle component of the error signal, if any is present, is thus applied via a capacitor 194 to the anode 196 of a rectifier diode 198 which is normally rendered non-conductive by a battery 200, polarized as shown. The rectifier 190 is connected to a bi-stable multivibrator 202 comprising a pair of tubes 204 and 206 connected in the manner indicated. The tube 204 of the multivibrator is, by virtue of the connection of its control grid to a point on the resistor voltage divider connected to the +B terminal 207, normally conducting, while the tube 206 is normally in a non-conducting state. Upon the application to the control grid of the tube 204 of a negative-going horizontal flyback pulse 208 derived in the deflection circuits of the receiver, that tube is cut off. The anode of the tube 204 rises, therefore, to a positive potential, as shown by the leading edge of the pulse 210, at which time the control grid of the tube 206 is rendered positive, thereby placing that tube in its conductive state.

The 3.6 megacycle component of the error signal, shown by the curve 212, is rectified by the diode 198 to provide at the terminal 214 a positive potential which is stored in the capacitor 216. This positive potential is sufficient to maintain the tube 206 in its conductive state and the tube 204 in its non-conductive state. When the amplitude of the 3.6 megacyle component of error signal decreases below a value determined by the potential of the battery 200, the rectifier diode 198 will be rendered non-conductive, whereupon the charge on the capacitor 216 will leak off at a rate determined by the time constant of the capacitor 216 and resistor 218. At this time, the negative potential of the battery 200 is applied to the control grid of the tube 206 and is sufficient to render that tube non-conductive. The multivibrator then reverts to its first state in which the tube 204 is conductive, so that the potential at the anode of the tube 204 becomes more negative, thereby defining the trailing edge of the pulse 210. At the end of the pulse 210, the blanking of the red and blue-designated electron beams in the kinescope ceases and the increased gain of the wobble amplifier is simultaneously removed, so that the amplitude of wobble is returned to its normal value. It is, therefore, apparent that by means of the apparatus of Figure 6, the duration of the initial lock-in period of each scanning line interval is determined by the time required for the tracking control circuits to cause the guiding electron beam to become positively locked-in with respect to the index signal-producing element or elements of the kinescope.

Having thus described our invention, what we claim as new and desire to secure by Letters Patent is:

1. A horizontal line screen color television system comprising: an image reproducing device including means for causing three electron beams to scan in line-by-line fashion across a target screen including horizontal strips of color-light emitting phosphors and indexing strips, means to modulate said three beams with respective color signals, means to undulate said three electron beams, means to blank all but one of said beams and to increase the amplitude of undulation thereof at the beginning of each line scan to insure interception of an index strip by said one beam, and a tracking circuit means associated with said image reproducing device including means to generate an index signal in response to impingement of an electron beam on said index strips, means to determine the phase of said index signal and means ot correct the vertical position of said beams in response to the phase of said index signal.

2. A color television image reproduction system comprising: an image reproducing device including, a target screen made up of a plurality of horizontally oriented elements of different colored light emitting phosphors and tracking index signal producing elements, and means for producing a plurality of electron beam components; means for causing said plurality of electron beam components to scan across said target screen to produce colored light by beam impingement upon said phosphor elements and to generate index signals by beam impingement upon said index signal producing elements; means for modulating said plurality of electron beam components respectively with different color representative signals; tracking circuit means associated with said image reproducing device and responsive to said generated index signals to shift the positions of said electron beam components relative to said target screen elements; and means for blanking all but one of said electron beam components during an interval of each scansion across said target screen so that, during said blanking interval, only said one electron beam component is effective to generate index signals.

3. A color television image reproduction system comprising: an image reproducing device including, a target screen made up of a plurality of horizontally oriented elements of different colored light emitting phosphors and tracking index signal producing elements, and means for producing a plurality of electron beam components; means for causing said plurality of electron beam components to scan across said target screen to produce colored light by beam impingement upon said phosphor elements and to generate index signals by beam impingement upon said index signal producing elements; means for modulating said plurality of electron beam components respectively with different color representative signals; tracking circuit means associated with said image reproducing device and responsive to said generated index signals to shift the positions of said electron beam components relative to said target screen elements; deflection means to undulate said electron beam components; and means for blanking all but one of said electron beam components during an interval of each scansion across said target screen so that, during said blanking interval, only said one electron beam component is effective to generate index signals.

4. A color television image reproduction system comprising: an image reproducing device including, a target screen made up of a plurality of horizontally oriented elements of different colored light emitting phosphors and tracking index signal producing elements, and means for producing a plurality of electron beam components; means for causing said plurality of electron beam components to scan across said target screen to produce colored light by beam impingement upon said phosphor elements and to generate index signals by beam impingement upon said index signal producing elements; means for modulating said plurality of electron beam components respectively with different color representative signals; tracking circuit means associated with said image reproducing device and responsive to said generated index signals to shift the positions of said electron beam components relative to said target screen elements; deflection means to undulate said electron beam components; means for blanking all but one of said electron beam components during an interval of each scansion across said target screen so that, during said blanking interval, only said one electron beam component is effective to generate index signals; and means to increase the amplitude of said electron beam undulation during said blanking interval.

5. A color television image reproduction system comprising: an image reproducing device including, a target screen made up of a plurality of horizontally oriented elements of different colored light emitting phosphors and tracking index signal producing elements, and means for producing a plurality of electron beam components; means for causing said plurality of electron beam components to scan across said target screen to produce colored light by beam impingement upon said phosphor elements and to generate index signals by beam impingement upon said index signal producing elements; means for modulating said plurality of electron beam components respectively with different color representative signals; tracking circuit means associated with said image reproducing device and responsive to said generated index signals to shift the positions of said electron beam components relative to said target screen elements; means for blanking all but one of said electron beam components during an interval of each scansion across said target screen so that, during said blanking interval, only said one electron beam component is effective to generate index signals; and means responsive to said generated tracking signals to terminate said blanking interval only when said one electron beam component is in proper position with respect to said index signal producing elements.

6. A color television image reproduction system comprising: an image reproducing device including, a target screen made up of a plurality of horizontally oriented elements of different colored light emitting phosphors and tracking index signal producing elements, and means for producing a plurality of electron beam components; means for causing said plurality of electron beam components to scan across said target screen to produce colored light by beam impingement upon said phosphor elements and to generate index signals by beam impingement upon said index signal producing elements; means for modulating said plurality of electron beam components respectively with different color representative signals; means to determine the phase of said generated index signals; tracking circuit means associated with said image reproducing device and responsive to the phase of said generated index signals to shift the positions of said electron beam components relative to said target screen elements; and means for blanking all but one of said electron beam components during an interval of each scansion across said target screen so that, during said blanking interval, only said one electron beam component is effective to generate index signals.

7. A color television image reproduction system comprising: an image reproducing device including, a target screen made up of a plurality of horizontally oriented elements of different colored light emitting phosphors and tracking index signal producing elements, and means for producing a plurality of electron beam components; means for causing said plurality of electron beam components to scan across said target screen to produce colored light by beam impingement upon said phosphor elements and to generate index signals by beam impingement upon said index signal producing elements; means for modulating said plurality of electron beam components respectively with different color representative signals; means to determine the phase of said generated index signals; tracking circuit means associated with said image reproducing device and responsive to the phase of said generated index signals to shift the positions of said electron beam components relative to said target screen elements; and deflection means to undulate said electron beam components.

8. A color television image reproduction system comprising: an image reproducing device including a target screen made up of a plurality of groups of horizontally oriented elements of different colored light emitting phosphors and a plurality of tracking index signal producing elements associated with each of said groups of phosphor elements in a fixed relationship to a particular one of said phosphor elements, and means for producing a plurality of electron beam components; means for causing said plurality of electron beam components to scan across said target screen during a succession of line intervals to produce colored light by beam impingement upon said phosphor elements and to generate index signals by beam impingement upon said index signal producing elements; means for modulating said plurality of electron beam components respectively with different color representative signals; deflection means to undulate said electron beam components; means to increase the amplitude of said electron beam undulation during a portion of each of said line intervals; means to determine the phase of said generated index signals; tracking circuit means associated with said image reproducing device and responsive to the phase of said generated index signals to control the positions of said electron beam components relative to said target screen elements; and means for altering the sense of operation of said tracking circuit means from one condition during said portion of each of said line intervals to another condition for the remainder of each of said line intervals.

9. A color television image reproduction system comprising: an image reproducing device including a target screen made up of a plurality of groups of horizontally oriented elements of different colored light emitting phosphors and a plurality of tracking index signal producing elements associated with each of said groups of phosphor elements in a fixed relationship to a particular one of said phosphor elements, and means for producing a plurality of electron beam components; means for causing said plurality of electron beam components to scan across said target screen during a succession of line intervals to produce colored light by beam impingement upon said phosphor elements and to generate index signals by beam impingement upon said index signal producing elements; means for modulating said plurality of electron beam components respectively with different color representative signals; deflection means to undulate said electron beam components; means to increase the amplitude of said electron beam undulation during a portion of each of said line intervals; means for producing a reference wave having a prescribed relation to said electron beam undulation; means to determine the phase of said generated index signals relative to said reference wave; tracking circuit means associated with said image reproducing device and responsive to the phase of said generated index signals to control the positions of said electron beam components relative to said target screen elements; and means for shifting the phase of said reference wave to alter the sense of operation of said tracking circuit means from one condition during said portion of each of said line intervals to another condition for the remainder of each of said line intervals.

References Cited in the file of this patent

UNITED STATES PATENTS

| | | |
|---|---|---|
| 2,664,520 | Wiens | Dec. 29, 1953 |
| 2,701,850 | Blayney | Feb. 8, 1955 |
| 2,777,087 | Fromm | Jan. 8, 1957 |